United States Patent Office 3,505,537
Patented Apr. 7, 1970

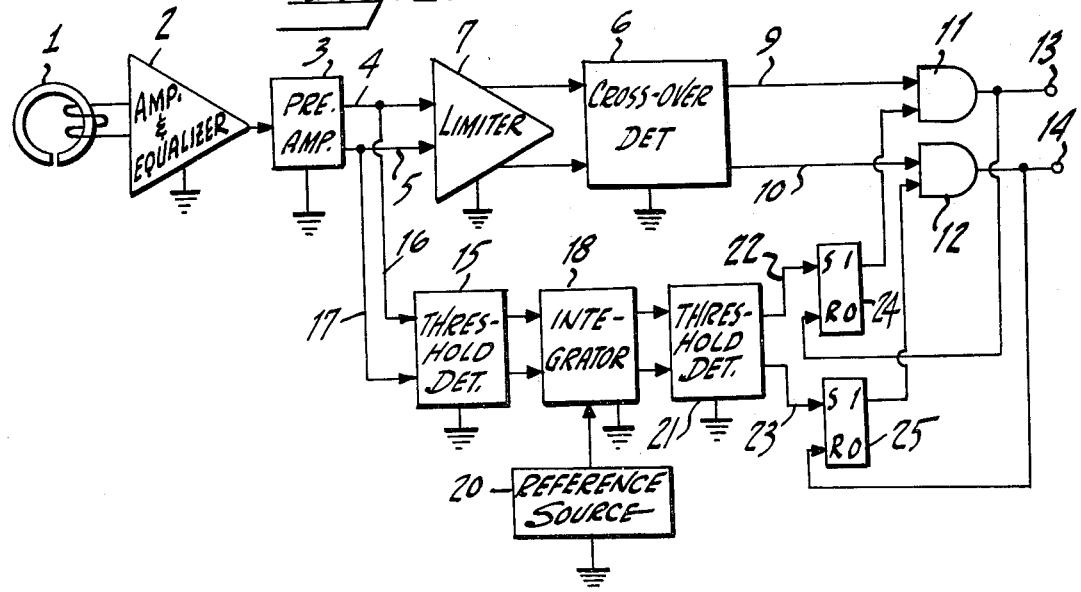
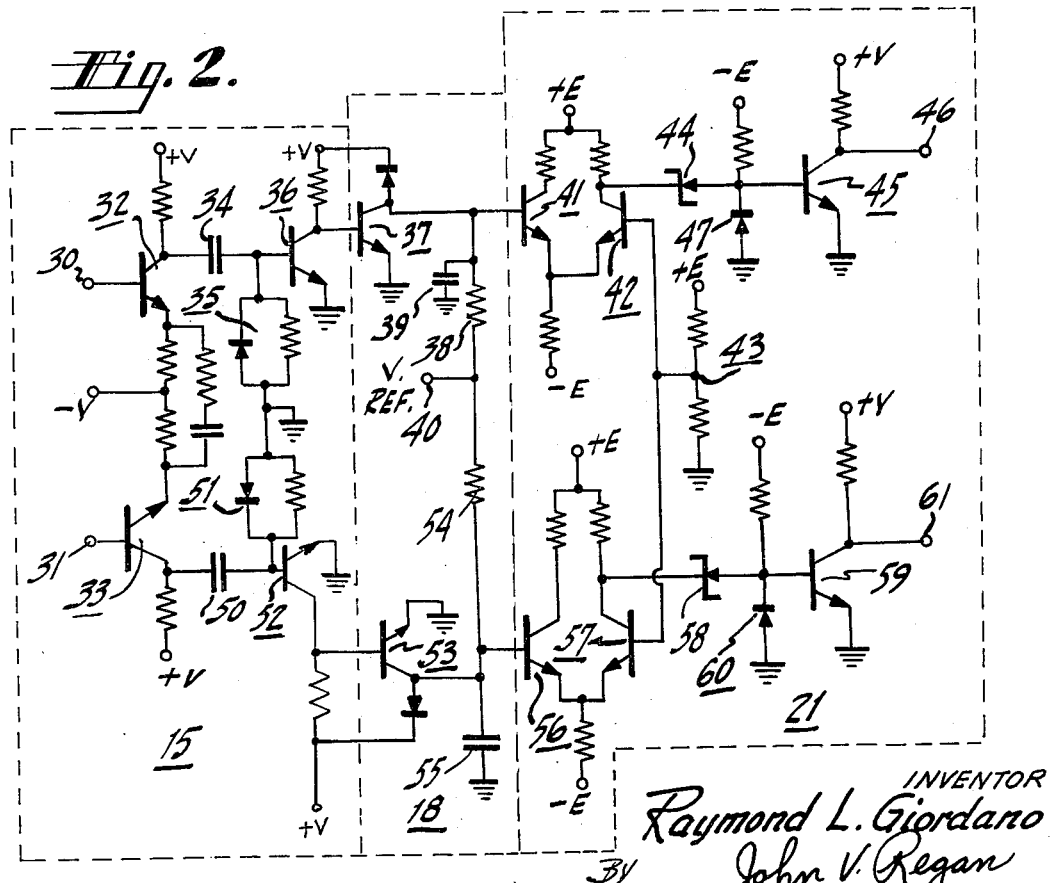

3,505,537
SIGNAL ENVELOPE DISCRIMINATOR
AND GATING CIRCUIT
Raymond L. Giordano, Berlin, N.J., assignor to RCA
Corporation, a corporation of Delaware
Filed Mar. 9, 1967, Ser. No. 621,843
Int. Cl. H03k 5/20
U.S. Cl. 307—235                         2 Claims

ABSTRACT OF THE DISCLOSURE

This invention relates to a signal amplitude and duration analyzing circuit having a first threshold detector circuit arranged to check the amplitude of a signal to be analyzed and to supply an input signal representative of an acceptable amplitude of the analyzed signal to an integrator. An integrated signal related to the duration of the integrator input signal is used to trigger a second threshold detector circuit. The second detector provides an output signal when the input signal to the analyzing circuit meets prescribed amplitude and duration requirements.

BACKGROUND OF THE INVENTION

Waveform analysis is used to check the waveshape of a data signal to determine whether or not the signal conforms to an acceptable standard in order to ensure that the signal may be successfully used in its operative environment. For example, in the field of data recording, it is desirable to check the recorded signals directly after the recording process in order to determine if any inadequacies exist in the recorded signal. Such recorded shortcomings may arise from defects in the record medium, improper operation of the recording equipment and, in the case of magnetic recording, improper erasure of the preceding recording. The present invention is arranged to analyze the recorded signals in a phase-modulation type recording process where the reproduction of the recorded binary information is a signal having either a positive or negative slope at the bit positions as a representaiton of one or the other of the two values of binary data. In conventional prior art devices, in order to check this type of recording process to determine that a satisfactory recording has been produced, the recorded signal was played back and the slope of the reproduced signal for the two data values, or phases, was checked against an acceptable known reference slope. Such prior art slope detectors have the inherent disadvantages of being electronically complex and failing to perform a complete recorded signal check. Specifically, the duration of the reproduced data signal was not checked and, thus, a short duration, high amplitude noise signal or a distorted data signal could produce an erroneous output signal from the slope detectors falsely indicative of a proper recording.

SUMMARY OF THE INVENTION

The present invention relates to a signal waveform analyzing circuit. More specifically, this invention is directed to an improved signal duration and amplitude, or signal envelope, detecting circuit.

An object of the present invention is to provide an improved waveform analyzing circuit for checking the amplitude and duration of either a negative slope or a positive slope input signal.

There is provided, in accordance with the present invention, a signal waveform analyzing circuit having a first signal threshold detector arranged to produce an output signal during the time that a detector input signal applied thereto exceeds a preset fixed level. An integrator is arranged to integrate the output signal supplied by the first signal detector. This integrator output signal is used as an input signal for a second threshold detector. The integrated signal is compared with a second threshold level signal and is effective to produce a second detector output signal during the time in which it exceeds this second level. This output signal is representative of an acceptable signal applied to the analyzing circuit since its amplitude has exceeded the first threshold over a sufficient duration to produce an integrator output signal which met the predetermined amplitude standard of the second threshold detector.

BRIEF DESCRIPTION OF THE DRAWINGS

FIGURE 1 is a block diagram of a playback system using the waveform analyzer circuit of the present invention; and FIGURE 2 is a schematic illustration of a waveform analyzer circuit embodying the present invention and suitable for use with the system shown in FIGURE 1.

DESCRIPTION OF THE PREFERRED EMBODIMENT

In FIGURE 1, there is shown a playback system illustrated as a system for use with a phase modulation type recording. A transducer 1 is arranged to "read" the recorded signal from a recording medium, e.g., magnetic tape. The output signal from the transducer 1 is applied to an amplifier and signal equalizer circuit 2 of conventional type. The output signal from the equalizing circuit 2 is converted by a pre-amplifier circuit 3 of a balanced line output type to a balanced pair of output signals on a pair of output lines 4, 5. These output signals are both applied to a cross-over detector 6 after being limited by a limiter 7. The detector 6 may be any suitable prior art circuit which is effective to produce an output signal on one of a pair of output lines 9, 10 depending on the phase, or slope direction, of a detected input signal. The lines 9, 10 are connected to AND gates 11, 12, respectively. The output signals from the gates 11, 12, in turn, are applied to corresponding output terminals 13, 14.

The balanced output signals from the pre-amplifier circuit 3 are, also, applied to a waveform analyzing circuit over a pair of lines 16, 17. Initially, the balanced signals are applied to a first threshold detector 15. The detailed operation of the analyzing circuit is presented in detailed form hereinafter with reference to FIGURE 2. The output signals from the detector 15 are representative of the existence of a balanced input signal on the lines 16 and 17 having a phase determined by the binary value of the data signal and an amplitude greater than a preset level. Output signals on both output lines from the threshold detector 15 are applied for separate integration to an integrator 18. A reference source 20 is provided to supply a charging level for the integrator 18 toward which the integration operation proceeds during the occurrence of the output signals from the first detector 15.

A second threshold detector 21 is arranged to receive the integrated output signals from the integrator 18 to compare them with a second threshold level. Thus, the data signal applied to the waveform analyzing circuit must pass an amplitude criterion of the first detector 15 and have a sufficient duration to produce an integrator output signal having an amplitude acceptable by the second detector 21. The output signals from the second detector 21, therefore, represent acceptable analyzer input signals on the input lines 16, 17. These output signals are applied over respective connecting wires 22, 23 to the "set" input circuits of respective ones of a pair of flip-flops 24, 25. The output signal from the "1" or "set," side of the first flip-flop 24 is applied to the first AND gate 11 while a similar output from the second flip-flop 25 is applied to the second AND gate 12. The output signals from the terminals 13, 14 are applied as "reset" signals to the flip-flops 24, 25, respectively. These reset signals may be delayed by suitable delay circuits (not shown) to ensure the stability of the "set" and "reset" operation, i.e., to prevent a signal "race" condition from occurring.

The system shown in FIGURE 1, also, may be used as a read-after-write detector for checking recording quality. Thus, the head 1 would be arranged to reproduce signals recorded by a preceding magnetic head (not shown) on a recording medium. In other words, a data signal is previously recorded on a moving record medium by a recording head and this recorded signal is next read by the playback head 1. The reproduced signal is, then, checked by the waveform analyzing circuit by the playback head 1, in order to test the quality of the recorded signal.

The system shown in FIGURE 1 has particular utility in the reproduction and checking of phase-modulated type of recordings. Since the phase-modulated recording must be checked for both binary "one" and "zero" data, the preamplifier circuit 3 is arranged to produce a balanced output on the pair of output lines 4, 5 where a signal on one line is the inverse of the other. Each time this signal crosses a so-called "zero" axis, it is indicative of the presence of a binary digit while the slope, or phase, of the signal indicates the value of the binary digit, i.e. a binary "1" or a binary "0." The limiter 7 operates to limit the balanced signals received from lines 4 and 5 to preset maximum positive and negative values. The output signals from the limiter 7 are applied to the detector 6 to determine the presence of a "zero" axis cross-over and to identify the value of the binary information by detecting the "slope," or phase, of the detected signal. Detected crossovers are effective to produce a corresponding output signal on either one of the output lines 9, 10 depending on the slope, or phase.

However, in actual practice the output signals from the detector 6 may be the result of a defective signal recording as previously discussed and which is unsatisfactory for subsequent use. Accordingly, the output signals from the detector 6 are applied as first input signals to corresponding ones of the AND gates 11, 12. The gates 11, 12 are activated by signals indicative of an analysis of the waveshape of the reproduced signals appearing at the output of the pre-amplifier 3. This waveshape analysis is performed by the operative combination of the two threshold detectors 15, 21 and the integrator 18 as discussed hereinafter.

This waveshape analysis comprises a first amplitude check of the balanced signals appearing on lines 16, 17 by the first detector 15 to produce an output signal during the time that a checked input signal remains above a preset threshold level. This output signal is integrated by the integrator 18 to produce a continuously increasing signal having a final amplitude dependent on the time that the aforesaid output signal is applied to the integrator and the reference level from the source 20. The integrated signal is used to trigger the second amplitude detector 21 when it rises above a second preset threshold level. The output signal from the second detector, accordingly, is representative of a signal from lines 16, 17 which has a satisfactory waveshape both in amplitude and duration.

Thus, the first threshold detector 15 is arranged to compare both the positive and negative phase input signals with a preset threshold level and to supply a signal to the integrator 18 during the time when this level is exceeded. The integrator 18 produces an output signal having a variable amplitude depending on the duration of the output signal from the first detector 15. This variable amplitude signal from the integrator 18 is applied to the second detector 21 to be compared with a second threshold level signal. The second detector 21 is effective to produce an output signal only when its input signal exceeds the second preset threshold level. This output signal, therefore, is indicative of a data signal on lines 16 and 17 having an amplitude passed by the first threshold detector 15 and a duration sufficient to allow the integrator to integrate to the second preset threshold level. An acceptable data signal will produce an output signal on either line 22 or line 23, depending on its phase, and "set" one of the flip-flops 24, 25. The "set" output signal from each of these flip-flops is used to gate a respective one of the AND gates 11, 12 to produce an output signal indicative of a proper recording. The output signals from the AND gates 11, 12 are then used to "reset" the corresponding one of the flip-flops 24, 25.

In FIGURE 2, there is shown a suitable circuit for performing the waveform analyzing operations described above. A pair of input terminals 30, 31 are arranged to be connected to the balanced signal lines 16, 17 of FIGURE 1, respectively. The input terminals 30, 31 are connected to the base electrodes of a pair of transistors 32, 33, respectively. The transistors 32, 33 are arranged in a signal amplifying circuit with their collectors connected to a supply source +V and their emitter electrodes connected to a second source —V. The output signal from the first transistor 32 is connected through a capacitor 34 to a resistor-diode by-pass circuit 35 and to the base of a third transistor 36. An output signal from the third transistor 36 is applied to a fourth transistor 37 to produce an operative state for an integrator circuit comprising a resistor 38 and a capacitor 39 connected across a reference source applied to a reference input terminal 40.

The signal across the integrator capacitor 39 is applied to the base of a fifth transistor 41 arranged as a differential amplifier with a sixth transistor 42. The base of the sixth transistor 42 is connected to a preset threshold source comprising a voltage divider 43. An output signal from the differential amplifier is applied through a Zener diode 44 to the base of a sixth transistor 45 having its output connected to an output terminal 46. A diode bias circuit including a forward biased diode 47 is connected to the base of the sixth transistor 45 to provide a bias level for the sixth transistor 45.

Similarly, the output of the second transistor 33 is connected through a capacitor 50 to a diode by-pass circuit 51 and the base of a seventh transistor 52. The output from the seventh transistor 52 is applied through an eighth transistor 53 to an integrator circuit, comprising a resistor 54 and a capacitor 55, connected to the reference signal terminal 40. An output signal from the integrator capacitor 55 is connected to a differential amplifier comprising a ninth transistor 56 and a tenth transistor 57. The base of the tenth transistor 57 is connected to the threshold signal circuit 43. An output signal from the tenth transistor 57 is taken through a Zener diode 58 to the base of an eleventh transistor 59 having a diode bias circuit 60. An output signal from the eleventh transistor 59 is applied to an output terminal 60. The output terminals 46, 60 are arranged to be connected to the output lines 22, 23 of FIGURE 1, respectively.

Without the presence of any input signals between the input terminals 30 and 31, the transistors 32 and 33 are conducting as Class A amplifiers with a constant D.C. collector current. This conducting state is effective to give rise to a quiescent D.C. level on the collectors of the transistors 32 and 33. Since the collectors are A.C. coupled through the capacitors 34 and 50, there is no signal applied to the succeeding transistors 36 and 52. Accordingly, the diode circuits 35, 51 and transistors 36, 52 are in an "off," or nonconducting, state. Transistors 37 and 53 are holding the two integrator circuits "off," i.e., the capacitors 39 and 55 are uncharged, while the biased sides of the differential amplifiers, i.e., transistors 42 and 57, are holding transistors 41 and 56 in an "off" state. Accordingly, the output transistors 45, 59 are being held in an "off" state.

Since the input signals at the input terminals 30, 31 are a balanced pair, one of the terminals will be positive while the other is negative for the same input signal. Thus, the first transistor 33 and its succeeding circuitry is arranged to detect the acceptability of one value of binary information, while transistor 32 and its related elements are arranged to detect the acceptability of the other value of binary information. In other words, for each binary information signal represented by a particular phase, one of the two input transistors 32, 33 will have a positive base signal applied while the other will have a negative base signal applied.

Considering the first transistor 33 and its succeeding circuitry, a negative signal applied at the base of transistor 33 and the positive signal applied at the base of transistor 32 will produce a collector signal which is coupled by the capacitor 50 to the base of the transistor 52 to be switched "on," i.e., exceed the turn-on threshold of transistor 52. An output signal from the collector of transistor 52 is, in turn, effective to turn transistor 53 "off." This state of transistor 53 allows the integrator capacitor 55 to begin charging to the reference level appearing at the terminal 40. If the input signal continues to hold the transistor 52 "on" for a sufficient duration, the capacitor 55 will charge to a level sufficient to turn "on" transistor 56, i.e., a level greater than the threshold signal holding transistor 57 "on." This operation is effective to turn transistor 57 "off" and the output transistor 59 "on" to produce an output signal on the output terminal 60. The aforesaid concurrent positive signal appearing at the base of transistor 32 is effective to produce an output signal which is coupled by the capacitor 34 to the diode by-pass circuit 35. The diode circuit 34 is arranged to shunt this output signal without affecting the "off" state of the transistor 36.

When the input signal falls below the minimum needed to hold transistor 52 "on," then the initial conditions will be reinstated and the capacitor 55 will discharge through the conducting transistor 53. If this happens before an output signal is produced, the input signal is insufficient to either amplitude or duration, and the AND gate 11 is not triggered. A similar mode of operation is produced on the input transistor 32 and its succeeding circuitry when its input signal goes negative for the other value of reproduced binary data. An input signal representing a proper recorded data signal applied to transistor 32 is effective to produce an output signal on terminal 60 to trigger the AND gate 12.

Accordingly, it may be seen that there has been provided, in accordance with the present invention, an improved waveform analyzing circuit operative to analyze the amplitude and duration of both positive and negative slope input signals.

What is claimed is:
1. A waveshape analyzer circuit for checking input signals supplied on a balanced line comprising a first detector circuit connected to one side of said line and arranged to produce an output signal during the time that an input signal exceeds a predetermined minimum amplitude level, a first integrator circuit arranged to integrate said output signal from said detector, a second threshold detector arranged to produce an output signal when an integrated signal from said integrator exceeds a predetermined minimum reference level amplitude, a third threshold detector connected to the other side of said line and arranged to produce an output signal during the time that an input signal exceeds a predetermined minimum amplitude level, a second integrator circuit arranged to integrate said output signal from said third detector, a fourth threshold detector arranged to produce an output signal when an integrated signal from said second integrator exceeds a predetermined minimum reference level amplitude and a signal gating circuit having an input circuit connected to said balance line, a pair of output circuits, a first gate control circuit arranged to apply said output signal from said second threshold detector to control a signal gating operation from said input circuit to one of said output circuits and a second gate control circuit arranged to apply said output signal from said fourth threshold detector to control a signal gating operation from said input circuit to the other one of said output circuits.

2. A waveform analyzer circuit as set forth in claim 1 wherein said predetermined minimum amplitude level for said first threshold detector is equal to said predetermined minimum amplitude level for said third threshold detector and said minimum reference level for said second threshold detector is equal to said minimum reference level for said fourth threshold detector.

References Cited
UNITED STATES PATENTS 3,041,475   6/1962   Fisher _____ 307—236
3,277,311   10/1966  Merlen et al. _____ 328—111 X DONALD D. FORRER, Primary Examiner J. D. FREN, Assistant Examiner U.S. Cl. X.R.

307—234, 236; 328—127, 116; 330—30